Nov. 14, 1950     E. R. JAGENBURG     2,530,201
MACHINE FOR DECROWNING PINEAPPLES
Filed July 20, 1946
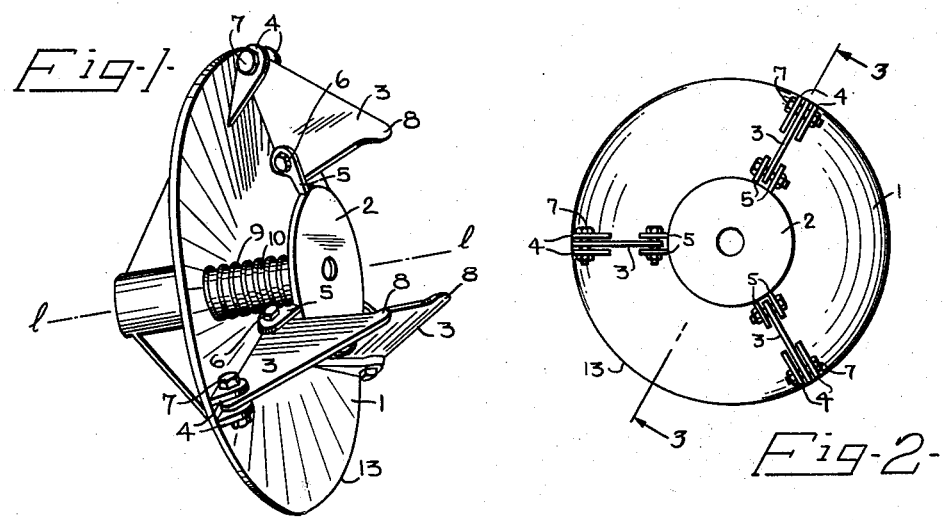
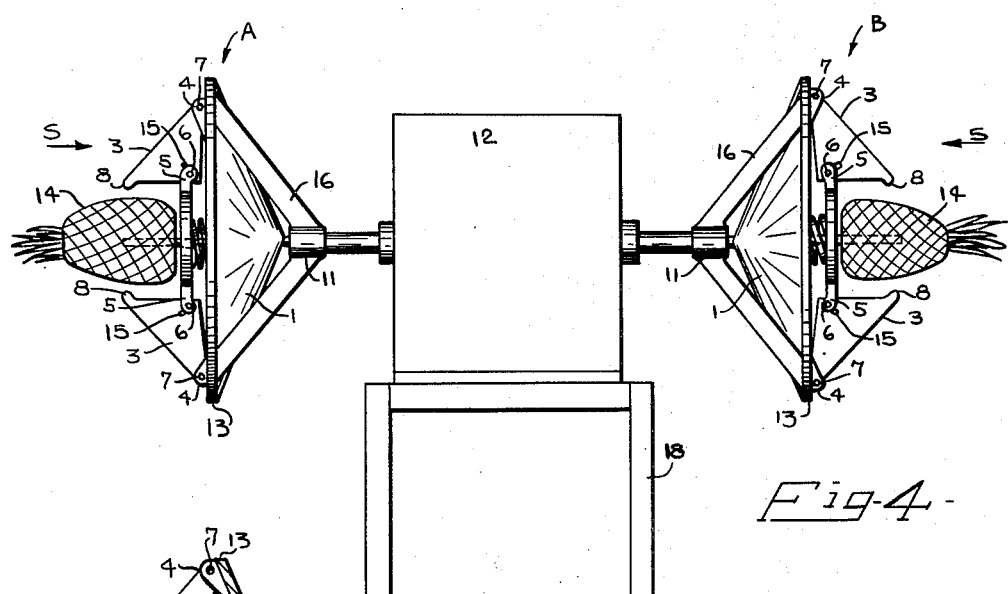
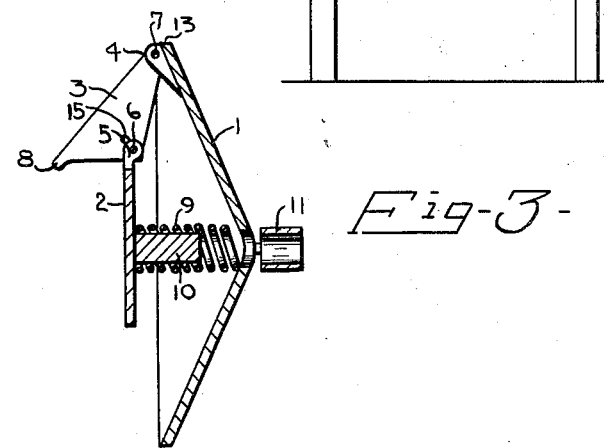
INVENTOR.
EUGENE ROBERT JAGENBURG
BY
ATTORNEY Patented Nov. 14, 1950

2,530,201

UNITED STATES PATENT OFFICE 2,530,201

MACHINE FOR DECROWNING PINEAPPLES

Eugene R. Jagenburg, Brooklyn, N. Y., assignor to E. R. Jagenburg, Inc., Brooklyn, N. Y.

Application July 20, 1946, Serial No. 685,276

1 Claim. (Cl. 146—6)

The invention relates to a machine for the removal of pineapple crowns.

In the pineapple industry a large proportion of the harvest is directed to canneries where the pineapples are trimmed, the root and the foliage ends or crowns are removed, whereupon the thus pretreated fruits are cored and sliced.

The most precarious item in these preparatory steps is the removal of the ingrown crowns which is mostly effected by a manual twisting operation. Since the crowns and particularly the leaves are growths of great toughness, their removal is a difficult, tedious and time consuming operation; frequently the hands of the workmen are cut and torn by the tough cactus-like foliage ends and work stoppages are the unwelcome result.

Several suggestions have been made to replace the manual removal of the pineapple crowns by mechanical operation.

The devices designed for these purposes are provided with cutters which are frequently of the rotary type and which sever the ingrown crown from the fruit; the fruit is often held by locking means and the cutters are forced through the fruit beneath the crown tip; as the crown extends quite a considerable distance into the fruit body, a substantial part of the latter surrounding the crown is severed with the crown and as the same are discarded, the crown enclosing portion of the fruit goes to waste.

It is the primary object of the invention to eliminate this substantial waste in the mechanical decrowning work of pineapples.

It is a further object of the invention to effect the wrenching or twisting-out of the pineapple crowns by a mechanical device.

It is also an object of the invention to automatically discharge the fruits from the decrowning machine and to thereby greatly accelerate the work and increase the time output.

Another object of the invention is the creation of a pineapple decrowning machine which is durable, reliable, of an exceedingly simple construction and affords a high working efficiency.

With these and other objects in view which will become apparent as this specification proceeds, the invention is illustrated by way of example in the accompanying drawings.

In these drawings:

Fig. 1 is a perspective view of the pineapple decrowning machine embodying this invention, Fig. 2 is a front view of the machine shown in Fig. 1, Fig. 3 is a vertical sectional elevation on line 3—3 of Fig. 2, Fig. 4 is a side view illustrating the invention embodied in a duplex machine.

Referring to the drawings where similar parts are denominated by identical reference numerals, the pineapple decrowning machine shown in Fig. 1 comprises a base 1 of a preferably conical configuration; a circular disc 2 having a smaller diameter than the base plate 1 is hingedly connected with the latter. This hinged connection is accomplished by prongs or jaws 3; these prongs of which three are used in the instant embodiment of the invention have a triangular shape.

The base cone 1 carries three pairs of adjacent ears or lugs 4 provided with bores, which are symmetrically distributed at the rim portion 13 of the cone; a similar ear or lug arrangement 5 is applied at radially corresponding places to the peripheral part of disc 2.

The triangular prong 3 is introduced at two of its corner portions between each pair of ears 4 of base cone 1 and each pair of ears 5 of disc 2; bores are provided in the two corner portions of the prongs 3 and hinge pins 6 are entered through these bores and the adjacent ears 4, and 5 secured by screws 7; at the third or front corner portion the prongs are provided with rounded gripping projections 8.

In this manner a hinged suspension of the prongs 3 is established between base cone 1 and disc 2, whereby disc 2 is hung up in a center position relative to the rim 13 of the base cone 1 and due to slots 15 can be moved in a rectilinear path towards and away from the conical base plate 1; due to this reciprocative displacement of disc 2 the gripping projections 8 of the prongs are swung towards or out of the center line 1—1, Fig. 1. By the inward swinging of the prongs due to the movement of disc 2 towards base cone 1 the gripping ends 8 are forced to converge towards line 1—1 and are thereby forced in a closing position; by the displacement of the disc 2 in the opposite direction the gripping projections 8 are outwardly swung and opened.

In this manner a passage or entrance is created for the introduction of the pineapple between the three gripping prongs 3 and the projections 8 respectively.

Disc 2 is maintained in the forward or initial working position shown in the drawings by a spring 9; the spring surrounds stem 10 of disc 2; the stem ends short of the base plate to allow for the necessary displacement of the disc.

The spring abuts with its one end against disc 2 and with the other end against base cone 1.

Conical plate 1 carries a short sleeve 11 for connection of the machine to a suitable driving and speed reducer gear mechanism which is encased in housing 12 mounted on a support 18 for duplex operation, shown in Fig. 4. The sleeve 11 is secured to the plate 1 by means of three radially extending ribs or welding plates 16.

The operation of the device will now be described with particular reference to this figure.

The two decrowning machines A, B are set in rotation by the driving mechanism encased in housing 12.

The pineapple 14 is advanced by the work attendant with the front end in the direction of arrow into the gap or passage formed by the rotating prongs and the gripping projections 8 until it strikes disc 2. By further advance of the fruit the disc 2 is pushed inward against the tension of spring 9 which is compressed accordingly. Due to the inward movement of disc 2 the three jaws 3 are forced to swing towards the fruit until the latter is firmly gripped by projections 8.

It should be borne in mind that at this instant the disc 2 is rotated while the pineapple 14 does not rotate. The rotation of the disc is brought about by the machine-shaft and transmitted to the sleeve 11, which is preferably keyed to the shaft, thence to the base 1, and from there by means of the pair of lugs 4 on the base 1 and the pair of lugs 5 carried by the disc 2. Since each of the three triangular prongs 3 is disposed between opposite lug pairs 4 and 5, the rotation of the base 1 is thus transmitted to the disc 2. The pineapple 14 is not rotated at this instant since it is held manually by the operator, and any friction between the disc 2 and the end-surface of the fruit is insufficient to rotate the latter. However, as the inward movement of the disc 2 proceeds, under axial pressure, exerted by the operator from the fruit against the disc, the hinge pins 6 of the lugs 5 will slide in the slanting slots 15 whereby each prong 3 is caused to swing about its screw 7 as an arc center. Since the entire prong thus swings about the screw 7, the gripping ends 8 of the prongs are also swung in an arcuate path about the screw 7 as its center. After the disc 2 has been moved inwardly for a predetermined distance (depending on the thickness of the fruit), the projections 8 will make contact with the surface of the pineapple, and as the inward movement of the disc 2 continues, the prongs 8 will cut into the surface of the pineapple for gripping the fruit firmly.

In the moment when the firm grip of the pineapple is secured, rotation is imparted to it; as the crown end of the fruit is still held by the work attendant the rotation imparted to the fruit causes the wrenching-out of the crown. As the impetus which is required to wrench-out the crown is effected by the rotation of the machine the above described disadvantages are eliminated.

In the moment when the crown is removed, the pressure exerted on disc 2 is released; the disc is therefore pushed back in the initial position by spring 9 and the decrowned pineapple is automatically discharged from the machine; the fruit drops into a hopper or onto a conveyor, not shown. The machine is ready for another decrowning operation.

An exceedingly quick and efficient removal of the pineapple crown is obtained in this manner preserving at the same time the entire fruit body and eliminating the hitherto customary waste caused by the cutting-off of the crown accommodating end portion of the fruit.

The machine is described and illustrated by way of example only and changes including for instance the increase of the number of the gripping prongs may be made without departing from the spirit or the scope of the invention as substituted in the following claim:

I claim:

A rotatable machine for decrowning pineapples, comprising a conical base plate, a circular disc suspended in the center and in front of said base plate for rectilinear movement towards and from said base plate for gripping and releasing a fruit, respectively, a stem attached to the surface of the disc disposed opposite said base and ending short thereof, a spring between said base plate and said disc surrounding said stem, and a plurality of gripping prongs forming therebetween a passage for the introduction of the front end of the pineapple towards said disc, each prong pivoted with relation to the base at a point radially spaced from said disc and hinged thereto by a slot-and-pin connection to permit rectilinear movement of the latter to swing the prong about the pivot connection on the base and each prong having its center of gravity between the periphery of said disc and said pivot, each prong including an integral gripping projection arranged to be swung, about said pivot, inwardly relative to said disc and towards said base plate by the displacement of said disc into the fruit gripping position.

EUGENE R. JAGENBURG.

REFERENCES CITED

The following references are of record in the file of this patent:

UNITED STATES PATENTS

| Number | Name | Date |
|---|---|---|
| 529,953 | Presnell | Nov. 27, 1894 |
| 1,402,234 | Jones | Jan. 3, 1922 |
| 1,445,146 | Kohler | Feb. 13, 1923 |
| 1,785,011 | Felizianetti | Dec. 16, 1930 |
| 2,199,516 | Yeatts | May 7, 1940 |